United States Patent [19]
Dalakian

[11] Patent Number: 5,222,409
[45] Date of Patent: Jun. 29, 1993

[54] INDUSTRIAL ROBOT ARMS

[76] Inventor: Sergei V. Dalakian, Koshtoyan St., House #2, Flat 317, Moscow, U.S.S.R.

[21] Appl. No.: 765,554

[22] Filed: Sep. 25, 1991

[51] Int. Cl.$^5$ .......................... B25J 18/00; B25J 17/02; B25J 17/00
[52] U.S. Cl. .................................... 74/479 R; 74/103; 74/640; 414/733; 414/917; 475/5; 901/21; 901/23
[58] Field of Search ........... 74/103, 479, 640, 479 BP, 74/479 BF; 414/733, 917; 475/5; 901/15, 21, 23

[56] References Cited

U.S. PATENT DOCUMENTS

| | | | |
|---|---|---|---|
| 1,835,579 | 12/1931 | Westin | 414/733 |
| 3,108,498 | 10/1963 | James et al. | 475/5 |
| 4,065,001 | 12/1977 | Ohnaka | 414/917 X |
| 4,396,344 | 8/1983 | Sugimoto et al. | 414/917 X |
| 4,437,635 | 3/1984 | Pham | 74/103 X |
| 4,492,510 | 1/1985 | Tanii et al. | 414/733 |
| 4,563,788 | 1/1986 | Kobayashi | 74/103 X |
| 5,017,083 | 5/1991 | Sahlin | 414/744.5 X |

FOREIGN PATENT DOCUMENTS

| | | | |
|---|---|---|---|
| 0396752 | 11/1990 | Fed. Rep. of Germany . | |
| 948658 | 8/1982 | U.S.S.R. | 414/917 |
| 1247261 | 7/1986 | U.S.S.R. | 414/917 |

OTHER PUBLICATIONS

GMFanuc Robotics Corp.—Spec sheet for S-420 Drive (1 page).

GMFanuc Robotics Corp.—Product Line In Brief, cover and pp. 8-27.

Primary Examiner—Allan D. Herrmann
Attorney, Agent, or Firm—Marks & Murase

[57] ABSTRACT

An articulated robot arm or the like comprising a base, an upper arm which is pivotally secured to the base at a shoulder joint, a lower arm pivotally secured to the upper arm at an elbow joint, and optionally a "hand" or tool support pivotally secured to the lower arm at a wrist joint. A parallelogram linkage controls the relative position of the upper arm, lower arm, and base. The linkage has first, second, third, and fourth links joined by pivots. The first link is a crank which is pivotally connected to the base by a first pivot which is coaxial with the shoulder pivot. The second link of the parallelogram linkage is parallel to the crank link, and is fixed with respect to the lower arm. The third and fourth links join the first and second links to complete the parallelogram. At least one of the third and fourth links is fixed to the upper arm. The crank and the upper arm are rotated about the first pivot and the shoulder pivot in the same direction at the same angular velocity to raise and lower the entire arm as a unit, and are rotated in opposite directions to fold and unfold the arm. The rates of the respective rotations and the lengths of the upper and lower arms can be coordinated so the outboard end or wrist joint of the lower arm translates in a straight line relative to the base when the arm is folded and unfolded. Apparatus is described for flexing the wrist joint of the arm to maintain the orientation of the hand in fixed relation to the base during the other movements of the arms.

13 Claims, 5 Drawing Sheets

INDUSTRIAL ROBOT ARMS

BACKGROUND OF THE INVENTION

The present invention relates to robot arms, and particularly to articulated robot arms which are used industrially in automated manufacturing operations and the like.

Articulated robot arms are used in industry to perform such operations as welding, painting, placing objects on a conveyor in a certain orientation, assembling parts, and the like, particularly on a production line where such tasks are performed repetitively on identical workpieces.

Robot arms must learn and precisely repeat well-defined, complex motions to function in an industrial environment. Each section of an articulated arm must be translated and rotated in a well-defined way, in relation to the other sections of the arm. Such precision is required to move the terminal segment, or "hand," of the arm in the directions and to the positions which are necessary to carry out the intended function. Each section of the arm requires one or more drives, and the arm requires a programmable control system to operate the drives in coordination.

In the mechanically simplest and electronically most complex articulated arms, each jointed section of the arm is articulated with respect to the base or adjacent sections by an independent drive, and each drive is independently controlled. While very versatile in terms of its range of possible movements, such an arm requires a separate, coordinated program for each drive. To carry out a seemingly simple movement of the hand, such as translation in a straight line, by articulating segments of the arm, complementary rotations of the respective sections must be independently programmed, and the respective programs must be executed synchronously.

An articulated arm having independently driven sections also requires some of the relatively heavy drives to be mounted on the arm at a distance from its base. These drives thus are cantilevered a substantial distance from the base when the arm is extended horizontally. Much of the mass of the arm is thus needed simply to support its drives. This reduces the payload the arm can handle and the precision with which the arm can be programmed to move and reach its intended positions.

An alternative to a robot arm which has fully independent drives for each section is one in which mechanical linkages, such as parallelogram or "pantograph" linkages. These linkages join two or more adjacent sections of the arm so when one section is driven the next section moves in a complementary manner. This eliminates the need for a separate drive and separate programming for the next section. Pantographic robot arms commonly use a ball circulating screw to change the shape of the pantograph.

These pantographic arms have several disadvantages. First, the robot's wrist cannot move along a straight line with only one motor drive. The orientation of the wrist is continually changing as the arm moves, which is undesirable for most robotic applications.

Second, after a period of use the ball circulating screw will lose its precision and, due to wear, clearances will develop between its components. There is no practical method to restore the necessary accuracy to a worn ball circulating screw mechanism. The only solution is to replace the entire ball circulating screw assembly.

Third, it is difficult to protect the ball circulating screw of a pantographic robot arm from dirt, grit, water, paint, and other contaminants when the robot is operating in the presence of these contaminants. Fourth, the ball circulating screws present many lubricating problems.

Another pantographic robot arm has a pantograph comprising two parallelogram linkages in series, of which the first is supported and driven from apparatus at a base and the second is supported and driven by the first. The two parallelogram linkages are joined by two meshing sector gears. The first sector gear is fixed to a link of the first parallelogram linkage and the second sector gear is fixed to a link of the second parallelogram linkage, so the respective parallelogram linkages move reciprocally and the "hand" at the end of the arm is translated by rotating one link of one parallelogram linkage about one of its axes with respect to one adjacent link.

SUMMARY OF THE INVENTION

One object of the invention is a folding multi-section robotic arm of the type having at least two articulated sections extending in series from a base, in which the drives for translation and rotation of each section are located at the base.

Another object of the invention is a relatively simple folding multi-section robotic arm having a mechanical movement to translate its most distal segment or hand along a straight line, without rotating the hand, as the arm is folded or unfolded.

Yet another object of the invention is an improved drive for a three-section, jointed robot arm which requires only two motors to raise and lower the arm with its sections relatively fixed, or alternatively to fold and unfold the arm in a manner which translates its third section without rotating the third section.

Other objects of the invention will become apparent to one of ordinarily skill in the art in light of the present specification, drawings, and claims.

The present invention is a robot arm or the like comprising a base, an upper arm, a lower arm, a parallelogram linkage, and first and second drive means. The base can be fixed to a stationary, pivoting, or mobile support. The first end of the upper arm is secured to the base by a first pivot to define a shoulder joint. The first end of the lower arm is secured to the second end of the upper arm by a second pivot to define an elbow joint.

The parallelogram linkage has first, second, third, and fourth links joined by pivots. The first link is defined by a crank which is secured to the base by a third pivot which is coaxial with the first pivot. The second link of the parallelogram linkage is parallel to its first link, and is fixed to the lower arm. The third link is fixed to the upper arm. The fourth link is parallel to the third link. The third and fourth links each join the first and second links.

The first drive means pivots the upper arm about the first pivot with the parts of the arm in relatively fixed positions, so the elbow joint does not flex. The second drive means folds and unfolds the upper arm by rotating the upper arm about the first pivot and the lower arm about the second pivot at equal rates in opposite directions. The elbow and shoulder joints thus flex or extend and the second end of the lower arm translates in a straight line relative to the base.

In one embodiment of the invention, the drive means can each be mounted at or near the shoulder joint, so neither drive is supported by the arm.

The arm can include apparatus for flexing the wrist joint of the arm to maintain the orientation of the hand during translation of the wrist. Such apparatus can comprise first, second, third, and fourth sprockets and two drive chains. The first sprocket can be fixed to the base of the arm coaxially with the first pivot at the shoulder joint. The second sprocket can be fixed to the tool support coaxially with the fourth pivot: at the wrist joint. The third and fourth sprockets can be fixed to each other, mounted in coaxial relation to the second pivot defining the elbow joint, and freely rotatable with respect to the upper and lower arms. The first drive chain is trained between the first and third sprockets. The second drive chain is trained between the second and fourth sprockets. This linkage has little weight which must be supported by the arm; just two drive chains and three sprockets are supported on the movable parts of the arm.

DETAILED DESCRIPTION OF THE INVENTION

While the invention will be described in connection with one or more preferred embodiments, it will be understood that the invention is not limited to those embodiments. On the contrary, the invention includes all alternatives, modifications, and equivalents as may be included within the spirit and scope of the appended claims. Like or corresponding parts of the respective views are indicated by like reference characters.

Figure 1:
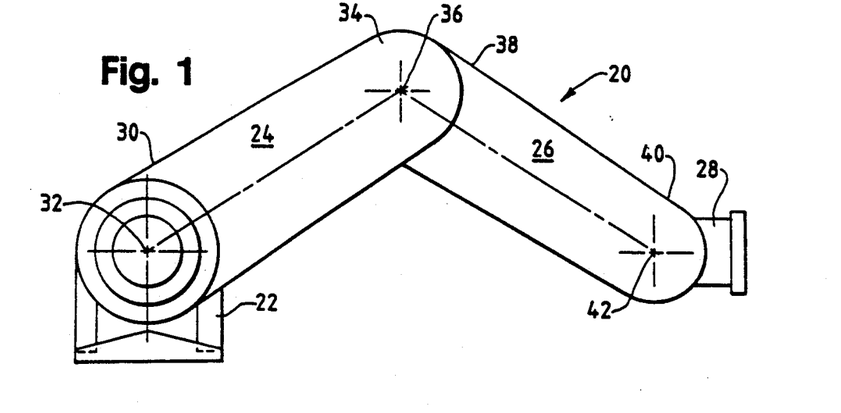
FIG. 1 is a side elevational view of a robot arm according to one embodiment of the present invention.
Figure 2:
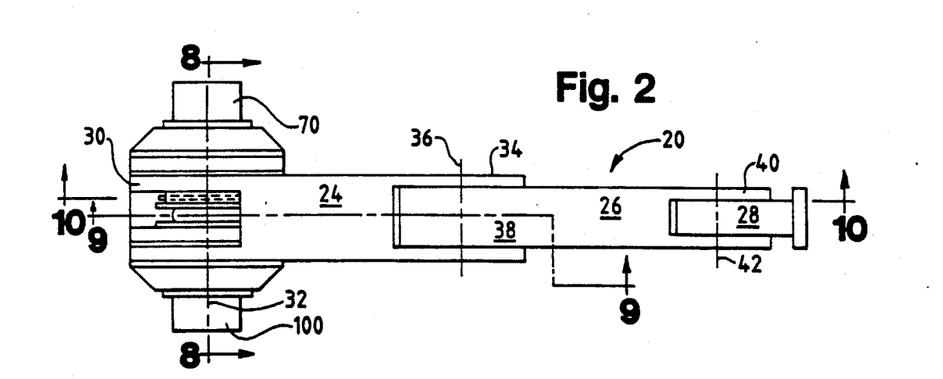
FIG. 2 is a top plan view of the arm of FIG. 1.

Referring now the drawings, and particularly to FIGS. 1 and 2, the robot arm generally indicated at 20 generally comprises a base 22, an upper arm 24 (sometimes known herein as a first member), a lower arm 26, and a hand 28. The upper arm 24 has a first end 30 secured to the base 22 by a first or shoulder pivot 32 for rotation about a horizontal axis to define a shoulder joint permitting a rotation of the upper arm 24 in a vertical plane. If horizontal movement of the upper arm 24 about a vertical axis is also desired, the base 22 can be positioned on a turret or other apparatus allowing such rotation.

The second end 34 of the upper arm 24 is connected by the second or elbow pivot 36 to the first end 38 of the lower arm 26. In this embodiment the axis of the pivot 36 is also horizontal, so the lower arm 26 also rotates about its pivot substantially in a vertical plane. The second end 40 of the lower arm 26 is connected by a third or a wrist pivot 42 to a hand or tool support 28. In this embodiment, the pivot 42 also permits rotation about a horizontal axis, in a vertical plane.

In the embodiment of FIG. 2, the upper arm 24, lower arm 26, and hand 28 are all centered on a common vertical plane and the second end 34 of the upper arm defines a fork which receives the first end 38 of the lower arm 26. A comparable structure is used to join the second end 40 of the lower arm 26 to the hand 28.

Figure 3:
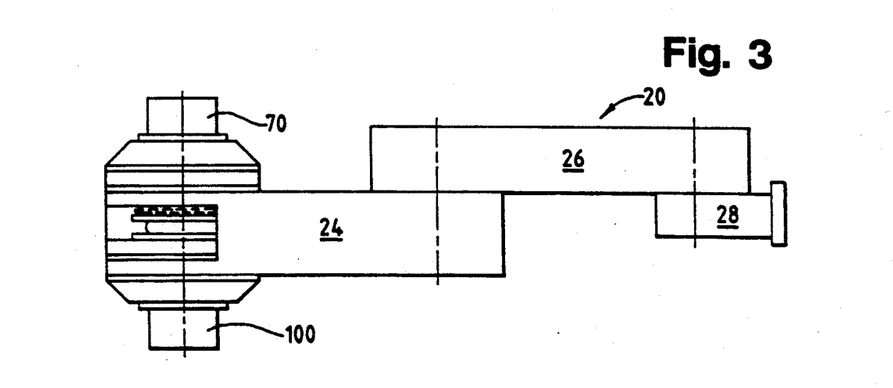
FIG. 3 is a top plan view of an alternate embodiment of the invention.

FIG. 3 illustrates an alternate, offset arrangement of the upper arm 24, lower arm 26, and hand 28 which functions equivalently to the embodiment illustrated in FIGS. 1 and 2.

Either embodiment of the arm has shoulder, elbow, and wrist joints joining a shoulder, upper arm, lower arm, and hand, analogous to the structure of the human arm and hand. The present robot arm thus has the joints necessary to move the hand 28 up and down, as well as radially toward or away from the base 22.

Figure 6:
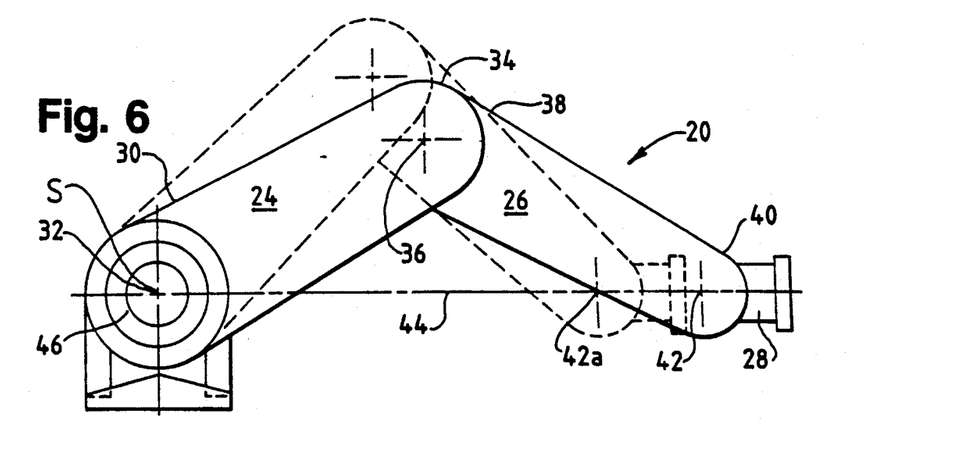
FIG. 6 is a view similar to FIG. 1 showing the arm folding from the position shown in full lines to that shown in phantom lines.

The mechanism provided for folding and unfolding the arm 20 will now be described schematically, with reference to FIGS. 6 and 7. Referring first to FIG. 6, the arm shown in full lines is expanded and the arm shown in phantom is retracted to some degree. The arm is neither fully extended nor fully retracted in FIG. 6. For convenience, the positions of the pivots 42 and 36 in the phantom view are designated as 36a and 42a. The object of the folding and unfolding movement is to cause the pivot 42 to move along the line indicated at 44 which passes through the pivots 32 and 42.

Figure 7:
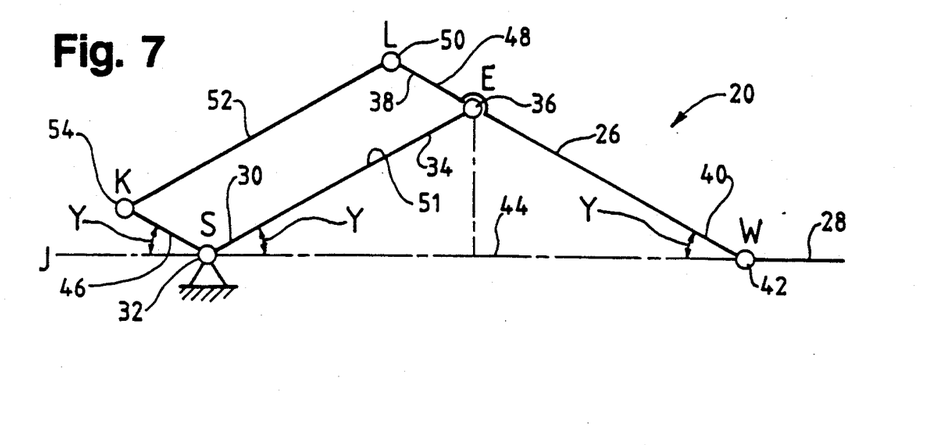
FIG. 7 is a schematic representation of the arm of FIG. 1.

Now referring to FIG. 7, the distance between the pivots 32 and 36 is equal to the distance between the pivots 36 and 42. An isosceles triangle is thus defined by the segment of the line 44 connecting the pivots 32 and 42, the line segment connecting the pivots 32 and 36, and the line segment connecting the pivots 36 and 42. The line 44 defines the base of this isosceles triangle.

Since the respective base angles at the pivots 32 and 42 must remain equal at all times in an isosceles triangle, the translation of the pivot 42 along the line 44 illustrated in FIG. 6 will take place if the upper arm 24 rotates about the pivot 32 and the lower arm rotates about the pivot 36 at angular velocities which are equal in magnitude and opposite in sense (one clockwise and the other counterclockwise).

Figure 9:
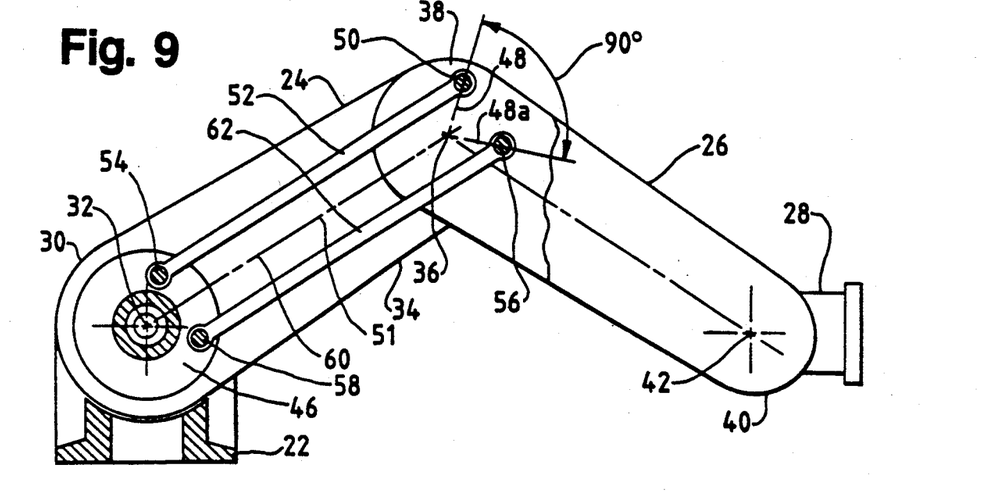
FIG. 9 is a sectional view of the arm taken along line 9—9 of FIG. 2, showing the mechanism for the movement of the arm.

Referring now to FIGS. 7 and 9, a parallelogram linkage is illustrated, made up of at least four links. The first link 46 (sometimes known as a second member) is defined by a crank which is secured to the base 22 (sometimes known herein as a third member) at a pivot which is coaxial with the shoulder pivot 32. The second link 48 is defined by a section of the lower arm 26 between the elbow pivot 36 and the link pivot 50. The third link 51 is defined by the portion of the upper arm 24 between the pivots 32 and 36. The fourth link 52 of the parallelogram linkage extends between the link pivot 50 and a pivot 54 of the crank 46. The links have end points defined by the pivots 32, 36, 50 and 54. However, the structure defining the links may extend beyond the pivots, within the scope of the present invention.

The arm includes at least first and second drive means which are further described below in connection with FIG. 8. Returning now to FIGS. 7 and 9, the first drive means pivots the upper arm 24 about the pivot 32 with respect to the base 22, without flexing the elbow pivot 36, while the second drive means folds and unfolds the arm 20.

A practical embodiment of the linkage in FIG. 7 is illustrated in FIG. 9. In FIG. 9, a first parallelogram linkage according to FIG. 7 is defined by the pivots 32, 36, 50, and 54 and the corresponding links. The first link is defined by the rotating sleeve 46 which functions as a crank, turning the pivot 54 eccentrically about the shoulder pivot 32. A portion of the lower arm 24 between the pivots 36 and 50 defines the second link 48. The portion of the upper arm 24 running along the line 60 defines the third link 51 between the pivots 32 and 36. A slide bar 52 between the pivots 50 and 54 defines the fourth link 52. A second parallelogram linkage is defined by the pivots 50, 54, 56, and 58 and the corresponding links. The first link of the second parallelogram is defined by the crank 46, which rotates the pivot 58 eccentrically about the axis 32. The second link is defined by the portion of the lower arm 26 lying between the pivots 36 and 56. The portion of the upper arm 24 lying on the line 60 defines the third link of the second parallelogram, as well as the third link of the first. The fourth link is again defined by a slide bar 62.

The first and second parallelograms preferably are arranged so that their respective first links are substantially perpendicular, as are their respective second links. This construction avoids "dead zones" when the arm is fully extended or fully retracted. A "dead zone" occurs when the sides of a parallelogram have collapsed. In the robot described above, when one of the parallelograms completely folds, the other is fully unfolded, and vice versa. The provision of two parallelogram linkages having complementary orientations also strengthens the arm and reduces the inaccuracy of positioning of the hand 28 caused by the slight-but inevitable play in the pivots.

Figure 8:
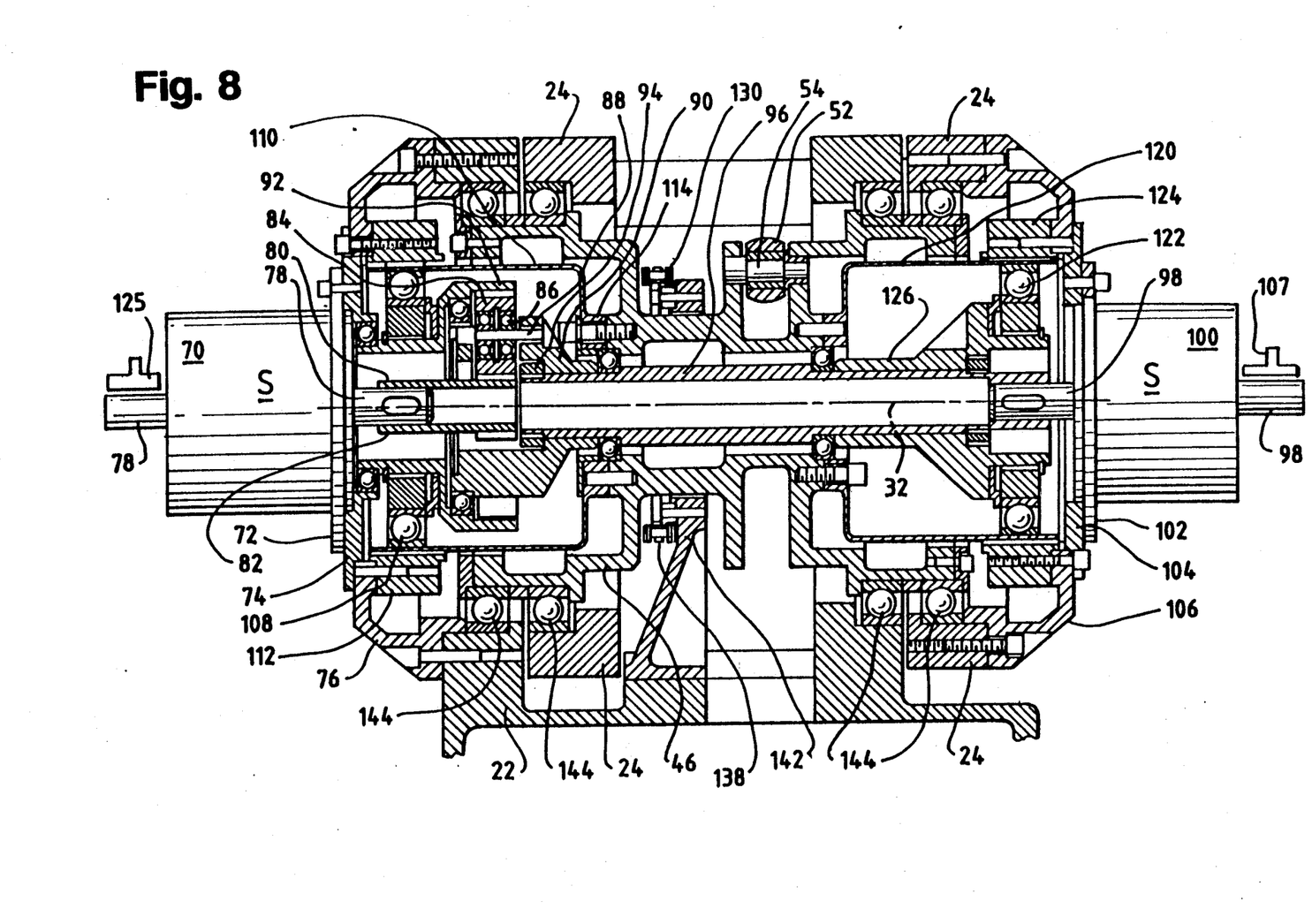
FIG. 8 is a sectional view of the arm taken along line 8—8 of FIG. 2, showing the construction of its shoulder.

One embodiment of first drive means for raising and lowering the arm 20 is found in FIG. 8, which is a section of the shoulder pivot 32 taken along the axis of that pivot.

The first drive means for moving the arm 20 with respect to the base 22 is powered by a motor 70 including a stator which is fixed to the base 72. The base 72 is bolted or otherwise fixed to the bearing race flange 74, which in turn is fixed to the gear retaining ring 76, which in turn is fixed to the base 22 of the arm 20. The stator of the motor 70 is thus immovably fixed to the base 22 by intervening structure.

The motor 70 has a rotor 78 which is keyed to the hollow stub shaft 80 of the sun gear 82 at the center of an epicyclic or planetary gear train. The planetary gear train also has planet pinions such as 84 which are carried by bearings 86 on stub axles 88 maintained in circumferentially spaced relation by a planet carrier or cage 90. The final element of the planetary gear train is a internally toothed annulus 92.

The planet carrier 90 is keyed or splined, and retained by a special nut 94, on a hollow shaft 96. The other end of the hollow shaft 96 is keyed or splined to the rotor 98 of the second motor 100. The stator of the motor 100 is fixed to the base 102 of the motor 100, which in turn is fixed to the ring 104, which in turn is immovably fastened to the ring 106, which in turn is fastened to an element of the upper arm 24. The motor 100 has an internal brake means or lock 107 which can be set when it is desirable to fix its stator with respect to its rotor 98, and thus to lock the planet carrier 90 in fixed relation to the upper arm 24. When the first drive means is functioning, this lock or brake on the motor 100 is set.

Returning now to the planetary gear set, because the planet carrier 90 is fixed with respect to the upper arm 24 when the lock on the motor 100 is engaged, rotation of the sun gear 82 is transmitted via the meshing, essentially non-orbiting planet gears 84 directly to the annulus 92, which is driven in the same direction as the sun gear 82 at a lower speed. For example, in this embodiment, the annulus rotates at one fourth the angular velocity of the rotor 78.

The annulus 92 drives the wave generator 108 of a first wave gear set which further comprises a radially flexible gear 110 meshed with an internally toothed annulus 112 which is radially rigid. The rigid annulus 112 is fixed with respect to the gear retaining ring 76, and thus with respect to the base 22. Rotation of the wave generator 108 within the flexible gear 110 flexes the portion of the flexible gear 110 adjacent to the wave generator 108 radially outward into meshing relation with the fixed, rigid gear 112.

The gear 110 and annulus 112 of a wave gear set each have many finely pitched teeth, and the flexible gear 110 has slightly fewer or more teeth (usually one tooth less) than the fixed gear 112. The wave generator 108 causes the teeth of the gears 110, 112 immediately adjacent to the wave generator to mesh sequentially, while the teeth significantly out of phase with the wave generator are radially separated, and thus not meshed. The different number of teeth on the fixed and flexible gears causes one of them to rotate with respect to the other. The rotation of the moving gear is very slow, for example 1/100 to 1/500 as fast as the rotation of the wave generator.

The flexible gear 110 has a hub generally indicated at 114 which is fixed to the crank 46. The crank 46 and upper arm 24 are relatively fixed so long as the motor 100 is locked. This is so because the crank 46 is permanently fixed to the flexible gear 120 of a second wave gear set, the wave generator 122 of the second wave gear set is permanently fixed to the hollow shaft 96 (and thus ultimately to the rotor 98 which is locked with respect to the arm 24 as previously explained), and the rigid annulus 124 of the second wave gear set is also permanently fixed with respect to the arm 24. Rotation of the crank 46 while the latter is fixed with respect to the upper arm 24 thus rotates the upper arm 24 without changing the relation between the upper arm 24 and lower arm 26 (the latter of which is fixed with respect to the crank 4 by the previously described parallelogram linkage).

The planet carrier 90 is not literally stationary with respect to the base 22 during rotation of the arm 24 as just described, since the planet carrier 90 turns with the arm 24 so long as the motor 100 is locked. However, the rotation of the arm 24 and the planet carrier 90 is minimal compared to the rate of rotation of the rotor 78, the sun gear 82, the annulus 92, and the wave generator 108 as just described.

To summarize the gear train through which the motor 70 rotates the arm 24, the rotor 78 of the motor turns the sun gear 82 while the planet carrier 90 is essentially fixed, and therefore the planet pinions 84 driven by the sun gear 82 drive the annulus 92. The annulus 92 drives a wave generator 108 which rotates a flexible gear 110 with respect to a rigid gear 112. The rigid gear 112 is fixed with respect to the base 22. The flexible gear 110 rotates the crank 46, which is fixed with respect to the arm 24, therefore rotating the arm 24. The planetary gear set and the wave gear set in series provide a large gear reduction between the rotor 78 and the arm 24. An exemplary gear reduction is 100 to 500 times.

The second drive means, causing folding or unfolding of the upper and lower arms 24 and 26, will now be described, again primarily with reference to FIGS. 8 and 6.

First, assuming the folding operation is to be executed separately from the arm raising and lowering operation, the motor 70 (also known herein as a first drive/lock means) is locked by a brake means 125 so its rotor 78 and its base 72 are relatively fixed, and each of them is fixed with respect to the base 22. The motor 100, on the other hand, is unlocked so it can drive the folding and unfolding motion. The result of fixing the rotor 78 with respect to the base 72, and thus with respect to the base 22, is that the sun gear 82 is also fixed with respect to the base 22.

Rotation of the rotor 98 directly turns the shaft 96, to which the wave generator 122 of the second wave gear set is fixed by a sleeve 126 which is splined or keyed to the shaft 96. The rigid gear 124 of the second wave gear set is fixed with respect to the ring 106, and thus also with respect to the upper arm 24. The flexible gear 120 is fixed to the crank 46, as was previously stated. The rotation of the wave generator 122 causes the rigid gear 124, and thus the attached arm 24, to rotate with respect to the flexible gear 120 and the crank 46. The drive described in this paragraph is also known herein as third drive/lock means.

Rotation of the rotor 98 also moves the crank 46 with respect to the base 22. As was stated before, the sun gear 82 is fixed with respect to the base 22 so long as the motor 70 is locked. Rotation of the rotor 98 turns the shaft 96, and thus turns the planet carrier 90 about the sun gear 82, driving the annulus 92 of the planetary gear set. (The function of the rotor 98 described in the preceding sentence is also known herein as second drive/lock means.)

Rotation of the annulus 92 rotates the wave carrier 108. Since the rigid outer gear 112 of the first wave gear set is fixed with respect to the base 22, rotation of the wave generator 108 rotates the flexible gear 110 of the first wave gear set, with respect to the base 22, at a much lower speed determined by the gear reduction of the first wave gear set. The flexible gear 110 is pinned directly to the crank 46, so the crank 46 is turned with respect to the base 22. The structure other than the annulus 92 described in this paragraph is sometimes known herein as 'drive means.

To facilitate the execution of folding and unfolding movements, the gear ratios of the respective gear sets are selected so the arm 24 is rotated about the pivot 32 with respect to the crank 46 at the angular velocity +2X, and so the crank 46 is rotated about the pivot 32 with respect to the base 22 at the angular velocity −X. (The contrary plus and minus signs indicate that one rotation is clockwise and the other is counterclockwise.)

The parallelogram linkages thus cause the lower arm 26 to rotate about the elbow pivot 36 at the angular velocity −X. The rotation of the upper arm with respect to the base is the sum of the rotation of the upper arm with respect to the crank (+2X), and of the crank with respect to the base (−X). The sum of these two components is +X. Therefore, as the conditions for linear translation of the pivot 42 require, the upper and lower arms pivot at equal angular velocities in opposite directions with respect to the base 22 or a fixed frame of reference.

If the two wave gear sets are identical, given that the planet carrier 90 and annulus 92 rotate in the same direction when the second drive means is operated, operation of the apparatus of FIG. 8 will turn the crank 46 and the upper arm 24 in opposite directions when the rotor 98 is turned. If the planetary gear set provides a gear reduction of 1:2 between the planet carrier 90 and the annulus 92,, the crank 46 will turn at half the angular velocity of the upper arm 24, so the necessary relation of angular velocities of the crank 46 and the upper arm 24 will be met. Alternatively, wave gear sets having different ratios can be used, and the remaining gearing can be changed as necessary to achieve the necessary gear reductions.

The operation of the gear trains for folding and unfolding the arm can thus be summarized as follows. The motor 70 is locked, so the sun gear 82 is fixed with respect to the base 22. Rotation of the rotor 98 successively turns the shaft 96, the sleeve 126, and the wave generator 122 of the second wave gear set. The rigid gear 124 of the second wave gear set is fixed to the arm 24, while the flexible gear 120 of the same wave gear set is fixed to the crank 46. Thus, the wave generator 122 causes the arm 24 to move in relation to the crank 46. The same rotation of the rotor 98 successively rotates the shaft 96, the planet carrier 90, the annulus 92, and the wave generator 108 of the first wave gear set. The flexible gear 110 of the first wave gear set is fixed to the crank 46, while the rigid gear 112 of the same set is fixed to the base 22, so rotation of the wave generator 108 moves the crank 46 with respect to the base 22. The crank 46 and upper arm 24 rotate in opposite directions at equal angular speeds (angular speed is defined herein as the absolute value of angular velocity), so the lower arm 26 (which moves with the crank 46 under the influence of the parallelogram linkage) and the upper arm 24 do the same. The motion illustrated in FIG. 6 results.

Figure 10:
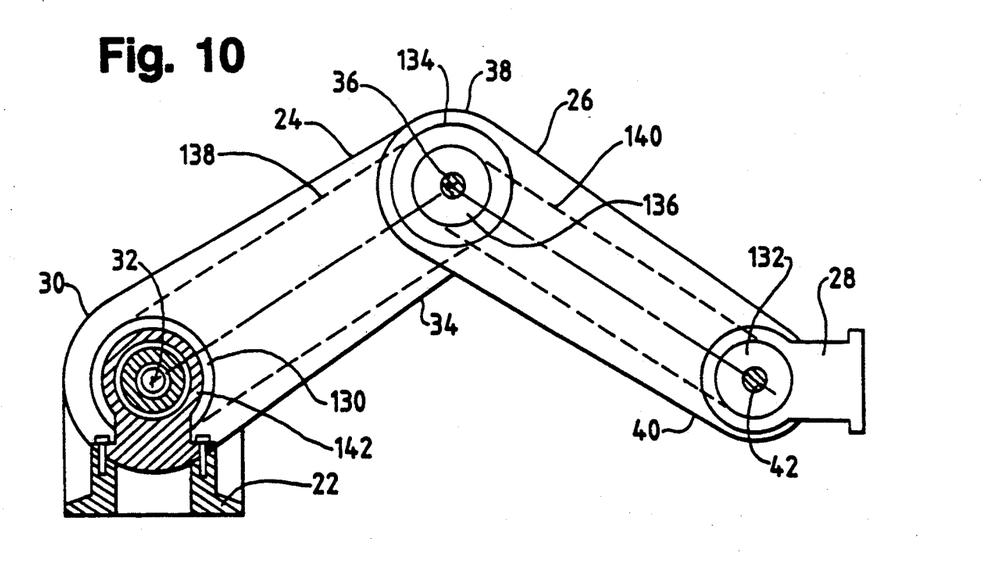
FIG. 10 is a sectional view of the arm taken along line 10—10 of FIG. 2, showing the mechanism for stabilization of the wrist.

Referring now in particular to FIG. 10, a suitable mechanism is illustrated for maintaining the hand 28, also referred to herein as a work support, in a single rotary orientation for all previously described movements of the arm 20. The means for flexing the wrist joint 42 comprises first through fourth sprockets 130, 132, 134, and 136 and first and second drive chains 138 and 140. The first sprocket 130 is fixed with respect to the base 22 and coaxial with the pivot 32. The second sprocket 132 is fixed to the hand 28 in coaxial relation to the pivot 42. The third and fourth sprockets 134 and 136 are fixed to each other and freely rotatable as a unit about their common axis, which is coaxial with the elbow pivot 36. The first drive chain 138 is trained about the first and third sprockets 130 and 134, and the second drive chain 140 is trained about the second sprocket 132 and the fourth sprocket 136.

The drive chains and sprockets can be replaced by equivalent means such as belts and sheaves, timing belts and timing sheaves, gear trains, or the like without departing from the spirit of the invention. Chains are preferred because they do not slip or stretch, they are more wear-resistant than belts, and they are more economical to fabricate and easier to install than gear trains.

The sprockets 130, 134 of one pair have identical numbers of teeth, as do the sprockets 132, 136 of the other pair. (Alternatively, the respective pairs of sprockets may have reciprocal ratios of teeth.) For any movement of the arm in the plane of FIG. 10, whether raising, lowering, folding, unfolding, or a combination of such movements, the phase of the first sprocket remains unchanged, and thus the first chain 138 maintains the third and fourth sprockets 134, 136 in the same, unchanged phase as the first sprocket 130. The second drive chain 140 maintains the second sprocket 132 in the same phase as the fourth sprocket 136, so both are held in the same, unchanging phase of the first sprocket 130.

In an alternate embodiment of the invention, the chains 138 and 140 could be replaced by one or more rigid links and the sprockets 130, 132, 134 and 136 could each be replaced by a crank, analogous to the structure shown in FIG. 9 except that the crank corresponding to the first sprocket 130 would be fixed to the base 22 to prevent its rotation. If more or fewer articulated segments of the arm 20 were provided, more or less sprockets and chains could be used. Also, an orientation of the hand 28 other than level can be provided merely by loosening the second drive chain 140 or the first drive chain 138, shifting the hand 28 to the desired orientation, then reinstalling the previously loosened chain. The result would be a tilted orientation of the hand 28 which would be maintained for all movements of the arm.

Figure 4:
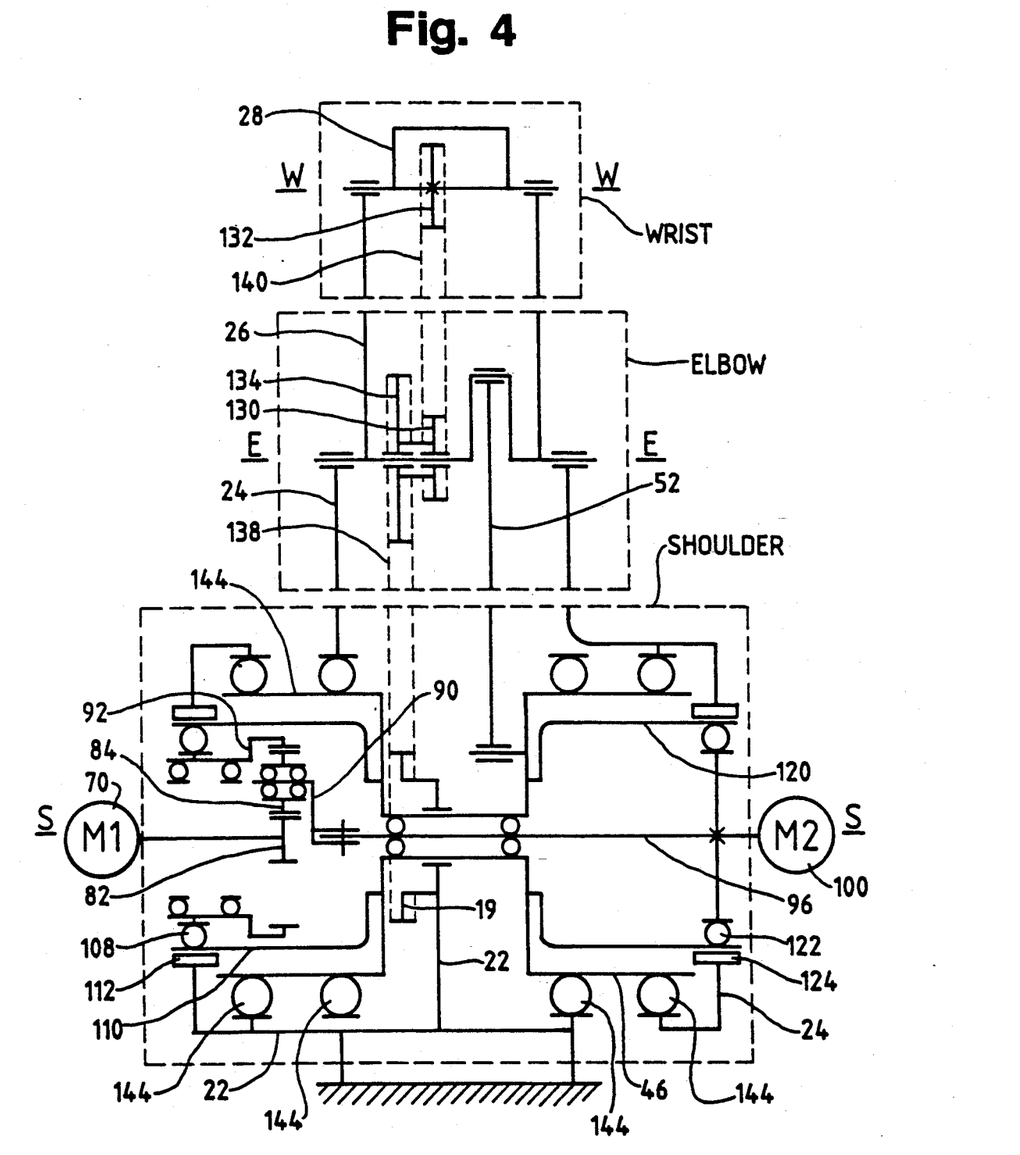
FIG. 4 is a kinematic diagram of the robotic arms of FIGS. 1-3 and their drives and gear trains.

The kinematic diagram shown in FIG. 4 summarizes the several functions of the arm which have previously been described. The robotic arm 20 consists of four main coupled sections: the base 22, the upper arm 24, the lower arm 26, and the wrist and hand 28. Since the principle of a pantograph is used in this robotic arm, the upper and lower arms 24, 26 are fixed to the adjacent sides of a theoretical parallelogram.

In FIG. 4, two independent kinematic chains are shown: the mechanism for movement and articulation of the arm 20, and the mechanism for stabilization of the wrist and hand 28.

The upper arm 24 is joined to the base 22 by the crank 46 and four bearings 144. The theoretical parallelogram (pantograph) is made up of the upper arm 24, the crank 46, the lower arm 26, and the slide bar 52. These sections are joined with hinges.

The crank 46 has an immovable joint with two flexible gears 110, 120 of two wave reducers. While one rigid gear 112 of these wave reducers is immovably joined to the base 22, the other rigid gear 124 is immovably joined to the upper arm 24. Inside the crank 46 the shaft 96 is carried on bearings and driven by the motor 100. One end of this shaft 96 is connected with the wave generator 122, which is in contact with the flexible gear 120. The opposite end of the shaft 96 is immovably joined with the planet carrier 90 of an epicyclic gear train, while the small sun gear 82 of this epicyclic gear train is joined directly with the rotor of the motor 70. The large sun gear 92 turns the wave generator 108, which is in contact with a flexible gear 110.

The small sun gear 82 used here has one fourth as many teeth as the large sun gear 92, so for one complete turn of the wave generator 108, the wave generator 122 will make two complete turns in the same direction. In other words, while the small sun gear 82 is stationary, two complete turns of the planet carrier 90 will cause one complete turn of the large sun gear 92. The number of teeth of the planet pinions 84 is unimportant, and they have the same pitch as the teeth of the gears 82 and 92. The brakes or locks for the motors, which can be located inside the motors, are not shown in the Figures.

Movements of the Robotic Arm

Two types of movements are possible, depending on which motor is working. First, the arm can be moved up and down without changing its configuration, and second, the arm can be folded and unfolded while moving the wrist along a straight line. Let the initial position be a semi-folded robotic arm, as shown in FIG. 1.

When raising and lowering the arm 20, the motor 100 is off. The brake inside it is locked. The clockwise turning of the rotor 78 (if you are looking from the side of the motor 100) directly transmits motion to the small sun gear 82 (FIG. 4).

Figure 5:
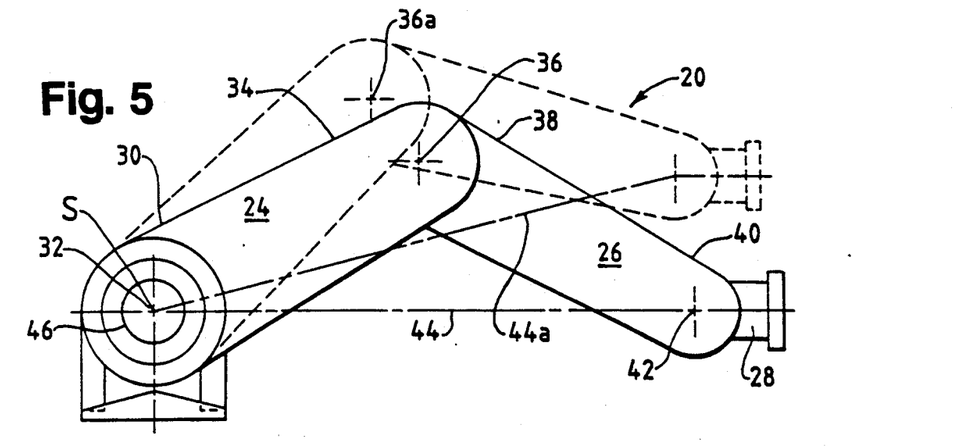
FIG. 5 is a view similar to FIG. 1 showing an upward movement of the arm from the position shown in full lines to that shown in phantom lines.

The planet carrier 90 is connected by the shaft 96 with the motor 100, and is stationary. The rotation of the small sun gear 82 through the planet pinions 84 transmits motion to the large sun gear 92 and further to the wave generator 108. The resulting rotation of the wave generator 108 is four times slower than the rotor of the motor 70, in the opposite direction (counterclockwise). The rigid gear 112 of the wave reducer is immovably fixed to the base 22, therefore the flexible gear 110 turns counterclockwise relative to it and drives the crank 46, which in its turn, through the slide bar 52, raises the arm 20, without changing the configuration of the robotic arm (FIG. 5). When the motor 70 is reversed the robotic arm 20 will be lowered, also without changing its configuration.

The arm 20 is folded as follows. The motor 70 is off, and its brake is locked. The counterclockwise turning of the rotor of the motor 100 directly transmits motion to the shaft 96 and the wave generator 122, and also through the epicyclic gear train (the planet carrier 90 and the large sun gear 92) to the wave generator 108 (FIG. 4). Therefore both wave gear sets are in motion, keeping in mind that the ratio of the epicyclic gear train is 1:2 while the small sun gear 82 is stationary. The wave generator 108 rotates in the same direction as the wave generator 122 (both counterclockwise), but half as fast.

The rotation of the wave generator 108 turns the flexible gear 110 as well as the crank 46 counterclockwise at the speed $-X$ (the minus sign indicates counterclockwise rotation).

The rotation of the wave generator 122 turns the rigid gear 124 as well as the upper arm 24 clockwise relative to the crank 46 and twice as fast, or, in other words, at the rate $+2X$.

The upper arm 24 simultaneously moves together with the crank 46 relative to the base 1 with a speed of $-X$ (counterclockwise) and relative to the crank 46 with a speed of $+2X$ (clockwise). As a result of these two movements, the upper arm 24 moves relative to the base 1 with a speed of $+X$. Thus the upper arm 24 and the crank 46 move relative to the base 22 at the same speed but in opposite directions, and the wrist 28 of the robotic arm moves along a straight line extending from the axis S—S of the shoulder (FIG. 6).

It is easier to understand how this motion along a straight line occurs by looking at FIG. 7, on which is shown the theoretical parallelogram which is the basis of this robotic arm.

Two adjacent hinges, S and E of this parallelogram, are coincident with the axis of shoulder and elbow of the robotic arm, and two other hinges, K and L, are coincident with the axis of joints, connecting the slide bar 52 with the crank 46 and the lower arm 26.

As the length of the sides SE and EW are equal, triangle SEW is an isosceles triangle, and we have angle ESW=angle EWS=Y. Since the side KS is parallel to the side LW, we can say that the angle KSJ=Y. When any movement of point W along a straight line extending from point S takes place, all the above mentioned angles will be equal. In other words, angles ESW=EWS=KSJ=Y. Conversely, if we turn the sides KS and SE in the opposite directions for equal angles, (or with equal angular speed) the movement of point W will occur along a straight line extending from point S. This is true only if the lengths of sides SE and EW are equal.

One important feature of the present pantograph type robot with a folding multi-section arm is that the kinematic diagram of the robotic arm to be designed supply the movement relative to ground with equal speed in opposite directions of two sections of the shoulder, which are two adjacent sides of the theoretical parallelogram. When this condition is realized, the wrist of the robotic arm will move along a straight line extending from the axis of the shoulder.

Mechanism for Stabilization of the Wrist

The mechanism for the stabilization of the wrist functions independently from the mechanism for movement of the arm. It involves two identical sprockets 130, 134 (FIG. 4, FIG. 10) connected with the power transmission chain 138, while the sprocket 130 is fixed on the post 142, which is fastened to the base 22. The axis of the sprocket 130 is concentric to the axis S—S of the shoulder, and the sprocket 134 is located concentric to the axis E—E of the elbow and is immovably joined to another sprocket 130 on the same axis. This sprocket 130 is connected by the power transmission chain 140 with an identical sprocket 132, the latter of which has the same number of teeth, is located concentric to the axis W—W of the wrist 28, and is immovably joined to the former sprocket.

The mechanism for stabilization of the wrist works because all these sprockets 130, 134, 130, 132 are in the same phase when the arm is in any position. While the sprocket 130 is stationary relative to the base 22 (and therefore to the ground) the wrist 28, which is fixed to the sprocket 132, will maintain its previous orientation during any movement of the arm.

If one wants to provide an additional driver to bend the wrist, there are three possible variants. In one variant, the location of the driver is concentric with the axis S—S of the shoulder, the sprocket 130 is forced to rotate relative to the post 142, and the wrist follows this rotation. In a second variant, the location of the driver is concentric with the axis E—E of the elbow, and the sprocket 130 is forced to rotate relative to the sprocket 134. In a third variant, the location of the driver is concentric to the axis W—W of the wrist 28, which is forced to rotate relative to the sprocket 132.

In all these cases the wrist maintains its previous orientation during any movement of the arm, while this additional driver is at rest.

What is claimed is:

1. A robot arm or the like, comprising:
   A. a base;
   B. an upper arm having a first end and a second end, wherein the first end of said upper arm is secured to said base by a first pivot to define a shoulder joint;
   C. a lower arm having a first end and a second end, wherein the first end of said lower arm is secured to the second end of said upper arm by a second pivot to define an elbow joint;
   D. a parallelogram linkage having a first link defined by a crank which is rotatably secured to said base by a third pivot coaxial with said first pivot, a second link parallel to said first link and fixed to said lower arm, a third link fixed to said upper arm, and a fourth link, wherein said third and fourth links are parallel and join said first and second links; and
   E. first drive means for folding and unfolding said arm by pivoting said elbow and said shoulder about said first and second pivots at angular velocities of equal magnitude in opposite directions, thereby translating the second end of said lower arm in a straight line relative to said base.

2. The robot arm of claim 1, wherein said first drive means comprises crank drive means for rotating said crank in one direction at the angular velocity given by the expression "$-X$" relative to said base and upper arm rotating means for rotating said upper arm in the opposite direction at an angular velocity given by the expression "$+2X$" relative to said crank.

3. The robot arm of claim 2, wherein said upper arm rotating means and said crank drive means are each powered by a single motor.

4. The robot arm of claim 1, wherein said first drive means is powered by a first motor mounted adjacent to said base.

5. The robot arm of claim 1, further comprising second drive means adapted to rotate said upper arm and said crank in the same direction about said first pivot at equal angular velocities, thereby pivoting said arm at said shoulder without flexing said elbow.

6. The robot of claim 5, wherein said second drive means further comprises brake means for relatively fixing said crank and said upper arm while said second drive means is turning one of said crank and said upper arm relative to said base.

7. The arm of claim 1, further comprising a support which is joined to said lower arm by a fourth pivot to define a wrist joint, and means for flexing said wrist joint.

8. The arm of claim 7, wherein said means for flexing said wrist comprises:
   A. a first sprocket fixed to said base coaxially with said first pivot;
   B. a second sprocket fixed to said support coaxially with said fourth pivot;
   C. third and fourth sprockets fixed to each other, mounted in coaxial relation to said second pivot, and freely rotatable with respect to said upper and lower arms;
   D. a first drive chain operatively connecting said first and third sprockets; and
   E. a second drive chain operatively connecting said second and fourth sprockets.

9. The robot of claim 7, wherein the axes of all of said pivots are horizontal.

10. The robot arm of claim 1, wherein the distance from said shoulder pivot to said elbow pivot is equal to the distance from said elbow pivot to said wrist pivot.

11. A robot arm or the like, comprising:
   A. a base;
   B. an arm having a first end which is pivotable relative to said base about a first pivot to define a shoulder and a second end, wherein said arm is articulated to define an upper arm, a lower arm, and an elbow pivotally connecting said upper and lower arms at a second pivot;

C. a support having a first end which is pivotable relative to said lower arm about a third pivot to define a wrist and a second end;

D. shoulder flexing apparatus for moving said support to a desired location relative to said base;

E. wrist flexing apparatus operating in coordination with said shoulder flexing apparatus for translating said support relative to said base without rotating said support, said wrist flexing apparatus comprising:
  i. a first sprocket fixed to said base in coaxial relation to said first pivot;
  ii. a second sprocket fixed to said support in coaxial relation to said third pivot; and
  iii. third and fourth coaxial sprockets fixed to each other, mounted coaxially with said second pivot, and freely rotatable with respect to said upper and lower arms;

I. a first drive chain operatively connecting said first and third sprockets; and J. a second drive chain operatively connecting said second and fourth sprockets.

12. A drive mechanism for alternately rotating a first member and a second member in the same direction with respect to a third member or in opposite directions about the third member, said mechanism comprising:

A. a planetary gear set comprising a sun gear, a planet carrier supporting planet pinions for rotation about said sun gear in meshed relation thereto, and an internally toothed annulus concentric with said sun gear and meshed with said planet pinions;

B. first drive/lock means for selectively rotating or locking one of said annulus and said sun gear with respect to the third member;

C. drive means for rotating the second member responsive to rotation of the other of said sun gear and said annulus.

D. second drive/lock means for selectively rotating or locking said planet carrier with respect to the first member; and E. third drive/lock means for selectively rotating or locking said first member with respect to said second member.

13. The mechanism of claim 12, wherein said second and third drive/lock means are operatively connected to synchronously drive or lock the parts they operate upon.

* * * * *

UNITED STATES PATENT AND TRADEMARK OFFICE
CERTIFICATE OF CORRECTION

PATENT NO. : 5,222,409

DATED : June 29, 1993

INVENTOR(S) : Sergei V. Dalakian

It is certified that error appears in the above-identified patent and that said Letters Patent is hereby corrected as shown below:

Title page, before Item [21], insert: -- [73] Assignee: Techna Pacific Corporation, Seattle, Washington. --.

Title page, column 2, Attorney, Agent, or Firm, delete "Marks & Murase" and insert therefor -- McAndrews, Held & Malloy, Ltd. --.

Column 6, line 54, delete 4, and insert therefore -- 46 --.

Signed and Sealed this

Twelfth Day of April, 1994

*Attest:*

BRUCE LEHMAN

*Commissioner of Patents and Trademarks*

*Attesting Officer*